United States Patent
Rittmeyer et al.

(10) Patent No.: US 9,461,526 B2
(45) Date of Patent: *Oct. 4, 2016

(54) GROUNDED RADIAL DIODE PACK

(71) Applicant: Hamilton Sundstrand Corporation, Charlotte, NC (US)

(72) Inventors: Gregory Alan Rittmeyer, Winnebago, IL (US); David S. Behling, Belvidere, IL (US); Timothy R. Welch, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 392 days.

This patent is subject to a terminal disclaimer.

(21) Appl. No.: 14/147,205

(22) Filed: Jan. 3, 2014

(65) Prior Publication Data

US 2015/0194863 A1    Jul. 9, 2015

(51) Int. Cl.
*H02K 11/00* (2016.01)
*H02K 11/04* (2016.01)
*H02K 9/19* (2006.01)

(52) U.S. Cl.
CPC ............. *H02K 11/0089* (2013.01); *H02K 9/19* (2013.01); *H02K 11/042* (2013.01); *H02K 11/046* (2013.01); *H02K 11/40* (2016.01)

(58) Field of Classification Search
CPC .. H02K 9/19; H02K 11/0089; H02K 11/042; H02K 11/046; H02K 11/40
USPC ........................................................ 361/220
See application file for complete search history.

(56) References Cited

U.S. PATENT DOCUMENTS

| 4,329,603 | A  | * | 5/1982  | Ballard ................ | H02K 11/042 310/54 |
| 2009/0052134 | A1 | * | 2/2009  | Casteel ................ | H01L 23/473 361/699 |
| 2009/0167257 | A1 |   | 7/2009  | Maddali et al. | |
| 2012/0195003 | A1 | * | 8/2012  | Ford ..................... | H02K 11/042 361/699 |
| 2013/0308291 | A1 | * | 11/2013 | Pal ........................ | H02K 11/042 361/820 |

OTHER PUBLICATIONS

Invitation Pursuant to Rule 63(1) EPC dated Apr. 8, 2016 in European Application No. 15150007.1.
M. Day, "Electrostatic Charge Generation In Hydraulic and Lubrication System", machinerylubrication.com, Aug. 18, 2013, 5 pages.
S. Carpenter, "Electrostatic Discharge", retrieved from https://web.archive.org/web/20121022084455/http://www.carpentersales/com.electd, Oct. 22, 2012 14 pages.
European Patent Office Search Report, Application No. 15150007.1, Jun. 22, 2016, 8 pages.

* cited by examiner

*Primary Examiner* — Zeev V Kitov
*Assistant Examiner* — Kevin J Comber
(74) *Attorney, Agent, or Firm* — Snell & Wilmer LLP

(57) ABSTRACT

The present disclosure relates to generators and their components. Specifically, a grounded radial diode pack is disclosed herein. A design to accommodate safe dissipation static charge build-up is disclosed. Safe dissipation of accumulated charge involves the provision of a suitable electrical path that will allow charges to flow to ground.

13 Claims, 4 Drawing Sheets

GROUNDED RADIAL DIODE PACK

FIELD

The present disclosure relates to generators and their components, and more particularly, to the interaction of a diode pack and generators.

BACKGROUND

Integrated Drive Generators ("IDG") may supply constant frequency AC electrical power to an aircraft. This may simplify the design of the complete electrical system of the aircraft. The IDG makes use of a highly reliable continuously variable transmission (referred to as the constant speed drive) which converts the variable input speed provided by an aircraft's engine into a constant output speed for the IDG's integral AC generator. A radial diode pack may be a component of the IDG.

SUMMARY

The present disclosure relates to a radial diode pack including an electrically conductive oil transfer tube electrically coupled to a negative DC rail via an electrically conductive metal washer. The present disclosure relates to a method of preventing static discharge of a radial diode pack. The method may include coupling an electrically conductive oil transfer tube of the radial diode pack to a grounding connection.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1 depicts a radial diode pack for use with an integrated drive generator in accordance with various embodiments;

FIG. 2 depicts a cross-sectional side view of the radial diode pack of FIG. 1 in accordance with various embodiments;

FIG. 3 depicts a close up cross-sectional perspective view of the radial diode pack of FIG. 2 in accordance with various embodiments;

FIG. 4 depicts a rotor circuit in accordance with various embodiments; and

FIG. 5 depicts a partial assembly drawing of an IDG in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

The present disclosure relates to the design of a generator component and more particularly, to the design of an integrated drive generator (IDG) radial diode pack. Aspects of the designs disclosed herein may be applicable to other generators, such as a variable frequency generator and/or an auxiliary generator. In general, a generator includes a stator (which functions as an exciter field) fixed relative to a housing and a rotor (which functions as an exciter armature) rotatable about an axis relative to the stator. The rotor includes a rotor frame carrying a rotor circuit that includes field turns and a rectifier assembly. The rectifier assembly comprises at least one diode. Rotation of the rotor relative to the exciter field induces an alternating current in the exciter armature turns, which is converted to a DC voltage by the rectifier assembly.

Generators can experience rectifier assembly failures due to damaged diodes. One failure mode results from an electrostatic discharge event between the rotor frame and an isolated rotor circuit. The rotor circuit is electrically insulated from the rotor frame. The isolation of the rotor circuit can result in a buildup of a high voltage potential on the rotor circuit relative to the rotor frame under common operational parameters. The voltage potential built up within the isolated rotor circuit discharges to the rotor frame when the voltage potential exceeds an insulation rating of the rotor frame. The voltage discharge can result in a voltage across a diode in the rotor circuit that exceeds the diode voltage rating. This sudden voltage across the diodes results in a reverse bias on each diode. The reverse bias may cause diode break down and/or a short in response to the voltage exceeding the diode voltage rating, thus damaging the rectifier assembly.

In accordance with various embodiments, a radial diode pack 10, shown in FIGS. 1 through 3. Radial diode pack 10 may be used in aerospace applications. Generally, oil cools radial diode pack 10. While not intending to be bound by theory, when a low conductivity liquid, e.g., oil, flows past a solid surface, the liquid acquires a space charge due to frictional charge separation at the liquid/solid interface. In general, ionic species of one sign are preferentially absorbed by the solid, leaving a net charge of opposite sign in the liquid. The space charge developed in the liquid is transported by the flow, resulting in a streaming current or charging current being carried by the liquid. If the walls of the flow system are insulated or floating, the flow electrification process also leads to an electrostatic accumulation of charge and the generation of high electrostatic surface potential at liquid/solid interfaces.

With respect to diode failures, the location or "site" which experiences the charge accumulation is typically the electrical circuit within the generator rotor. The electrical circuit within the generator rotor is insulated from the rotor shaft and floats electrically with respect to the rotor shaft and other IDG components. Various elements of the rotor electrical circuit come in contact with the oil stream in order to thermally cool the rotor. If the static charge of the rotor circuit reaches a high enough potential to break down the insulation system, an electrostatic discharge between circuit and rotor shaft may occur. The discharge event is quick (typically, measured in nanoseconds), but can be sufficiently strong to damage the diodes in the rotor circuit. The energy for this discharge event comes from the parasitic capacitance primarily between rotor circuit elements (windings) and rotor structure (slots). This capacitance is a "distributed" capacitance, but it is an effective energy storage system nonetheless. Depending upon rotor construction, most or all of the static charge voltage will be forced across a main field winding and the rectifier. Voltages in excess of 2000 Volts are typically required to break down the rotor circuit insulation system, and this magnitude is beyond the capability of currently used silicon diodes.

According to various embodiments, an approach to prevent static charge accumulation and the resulting discharge is to use materials and fluids that have fewer tendencies to generate static charge. This may be accomplished through additives and/or an oil selected/fashioned to prevent static charge accumulation.

According to various embodiments, a design to accommodate static charge build-up is to provide a means for safe dissipation of the charge. Safe dissipation of accumulated charge involves the provision of a suitable electrical path that will allow charges to flow to ground.

The rotor circuit (exciter armature, diode assembly, and main field) is electrically insulated from the rotor shaft. Stated another way, the rotor circuit floats electrically with respect to the shaft. An electrical connection between the rotor shaft and a single point within the rotor circuit has no effect on generator performance, but can control the level of voltage the rotor circuit can achieve with respect to the shaft. A direct connection (or ground) between the rotor circuit and shaft will fix that point of the rotor circuit to the shaft potential. The potential between all other points of the rotor circuit and the shaft will be dictated by normal rotor circuit operation. Likewise, a resistive connection can be made between the shaft and circuit. A resistive connection may hold rotor circuit voltage levels with respect to the shaft low enough to prevent static discharge. Static charge accumulation on the rotor circuit will dissipate at relatively high impedances.

Whether connected directly or through a resistive coupling, in such configuration the rotor circuit does not achieve a potential sufficient to result in static discharge. Disclosed herein is a connection which provides a path for safe dissipation of the charge. Stated another way, by electrically coupling any singular point of the rotor circuit to the shaft, developing a potential on the rotor circuit relative to the shaft is negated. The highest potential achievable in the rotor circuit relative to the shaft is merely the potential within that circuit itself. Thus, the rotor circuit is prevented from reaching a level where an electrical arc is likely.

Figure 1:
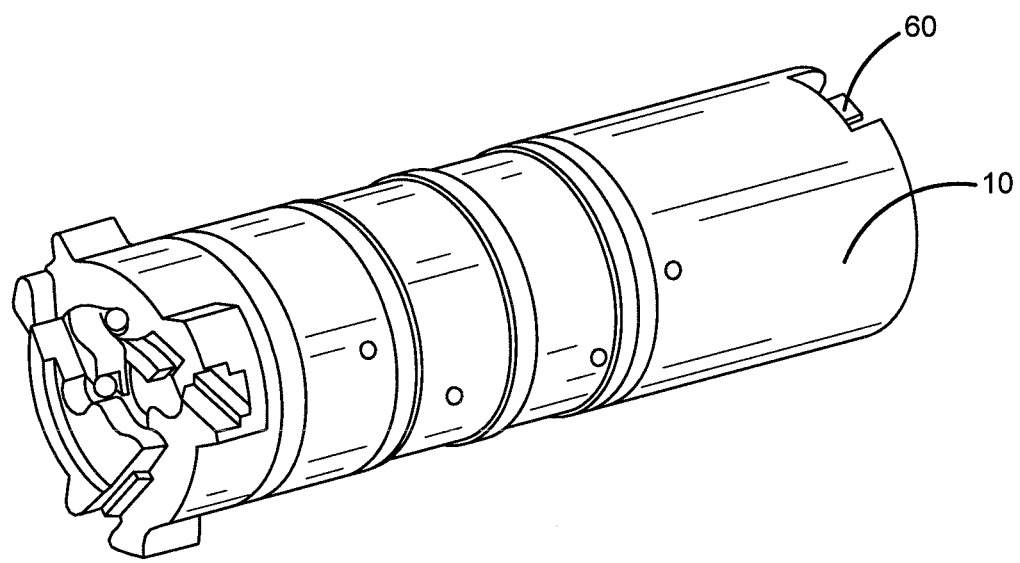
Figure 2:
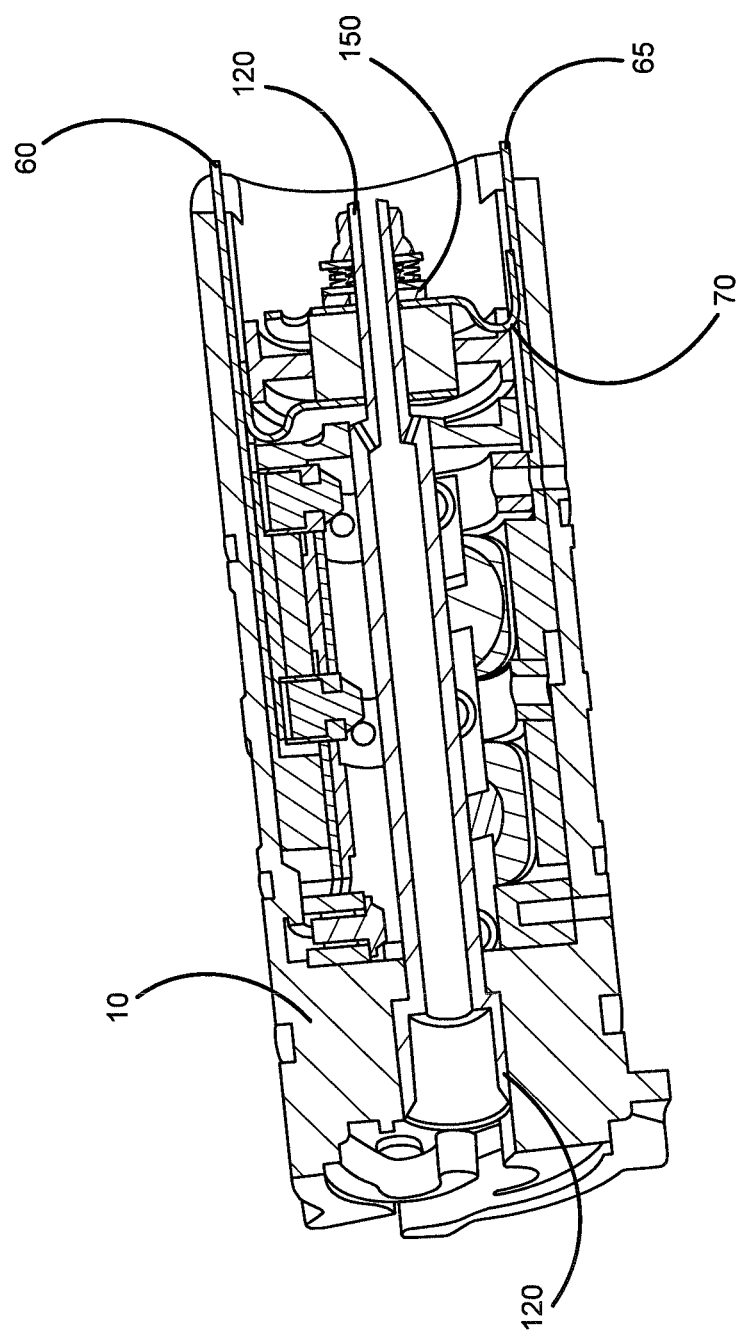
Figure 3:
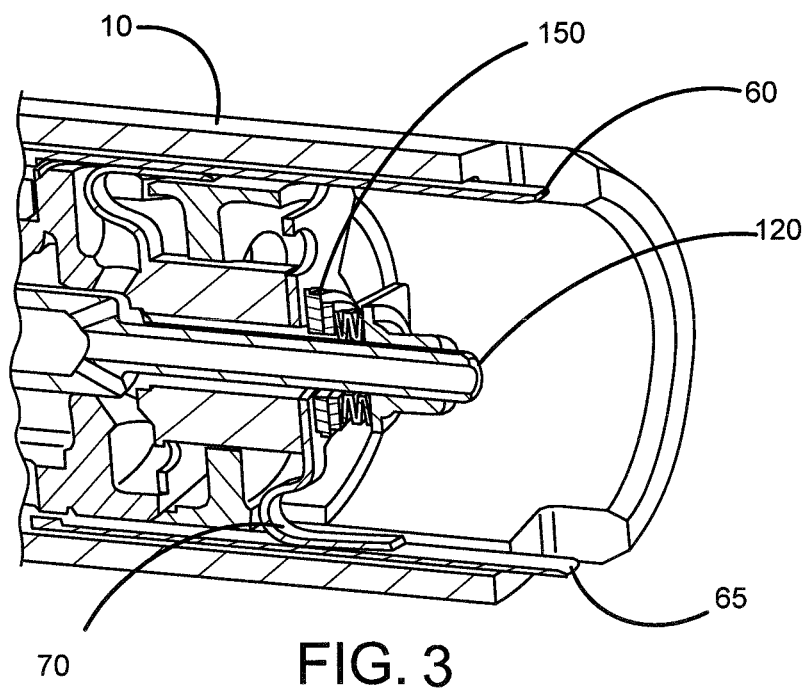
Figure 5:
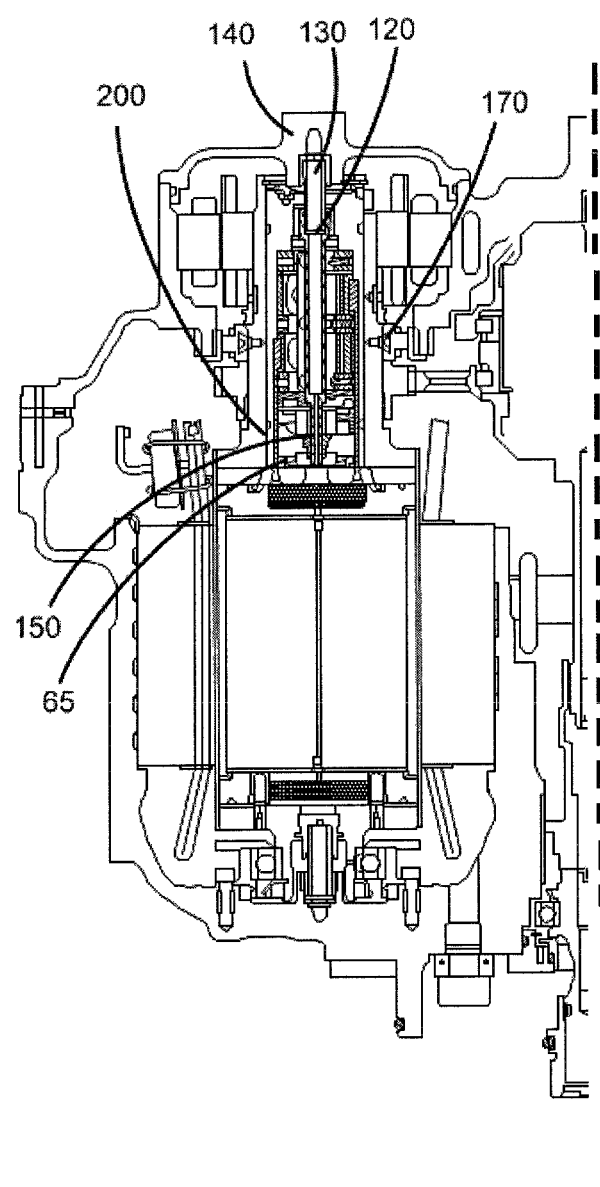

According to various embodiments, and with renewed reference to FIGS. 2, 3, and 5, a radial diode pack 10 is disclosed where a grounding connection is achieved indirectly through a metal washer 150 coupled to an oil transfer tube 120 of the radial diode pack 10. Metal washer 150 is conductive. Oil transfer tube 120 may be electrically and physically coupled to a second oil transfer tube 130. Second oil transfer tube 130 may be electrically coupled to the metal housing 140. The metal housing 140 is operatively and electrically coupled to a plurality of bearings 170. The bearings may be operatively and electrically coupled to the rotating rotor shaft 200. The metal washer 150 may be electrically coupled to the negative DC rail 65, (associated with positive DC rail 60 such as via an electrically conductive coupler 70.

Figure 4:
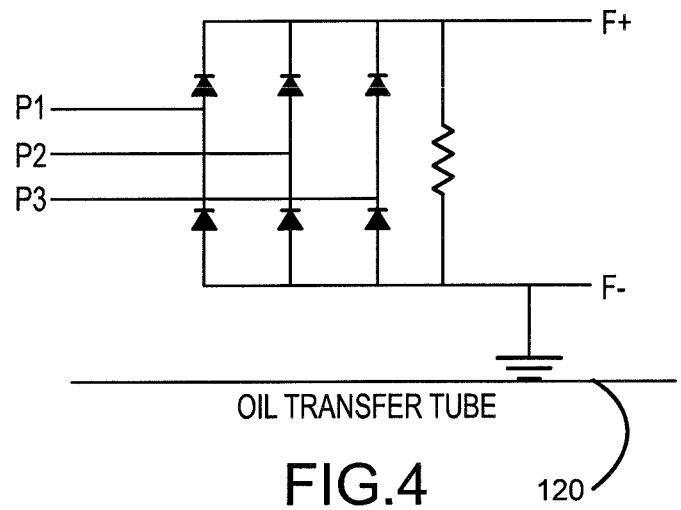

Thus, in this embodiment, there is no grounding connection directly from the rotor circuit to the rotor shaft 200. The connection is indirect including a path through at least one oil transfer tube. FIG. 4 outlines a high level representation of the rotor circuit. With this design, static charge accumulation and the resulting discharge to the diode pack assembly that can cause the diodes to fail is prevented. Thus, the diode pack incorporates an electrical ground within the diode assembly that prevents static charge build-up regardless of environmental conditions and oil conductivity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of preventing static discharge of a radial diode pack comprising:
   coupling an electrically conductive oil transfer tube of the radial diode pack to a grounding connection; and
   electrically coupling the electrically conductive oil transfer tube to a second electrically conductive oil transfer tube.

2. The method according to claim 1, wherein the electrically conductive oil transfer tube is housed within the radial diode pack.

3. The method according to claim 1, wherein the grounding connection is made via a negative DC rail of the radial diode pack.

4. The method according to claim 1, further comprising electrically coupling the electrically conductive oil transfer tube to a metal washer.

5. The method according to claim 1, further comprising electrically coupling the second electrically conductive oil transfer tube to a metal housing.

6. The method according to claim 5, further comprising electrically coupling the metal housing to a rotor shaft via a bearing.

7. The method according to claim 1, wherein a rotor circuit associated with the grounding connection is prevented from reaching a level where an electrical arc will occur.

8. The method according to claim 1, wherein the radial diode pack is configured for use with an integrated drive generator.

9. A radial diode pack comprising:
a negative DC rail;
an electrically conductive metal washer;
a first electrically conductive oil transfer tube; and
a second electrically conductive oil transfer tube electrically coupled to the first electrically conductive oil transfer tube and to the negative DC rail via the electrically conductive metal washer.

10. The radial diode pack of claim 9, wherein the negative DC rail is configured to accommodate safe dissipation of built-up static charge via the metal washer.

11. The radial diode pack of claim 10, wherein the safe dissipation of accumulated charge involves the provision of a suitable electrical path allowing charges to flow to ground.

12. The radial diode pack according to claim 10, wherein the second electrically conductive oil transfer tube is electrically coupled the to a metal housing.

13. The radial diode pack according to claim 10, wherein a rotor circuit associated with the radial diode pack is prevented from reaching a level where an electrical arc will occur.

* * * * *